United States Patent [19]

Hallerberg

[11] 3,844,391
[45] Oct. 29, 1974

[54] SPRAG TYPE FREEWHEEL CLUTCH
[75] Inventor: Karl J. Hallerberg, Plantkstadt, Germany
[73] Assignee: Borg-Warner-Stieber GmbH, Heidelberg, Germany
[22] Filed: Mar. 16, 1973
[21] Appl. No.: 342,009

[30] Foreign Application Priority Data
Mar. 27, 1972 Germany............................ 2214804

[52] U.S. Cl............ 192/41 A, 192/45.1, 192/104 B
[51] Int. Cl......................... F16d 41/07, F16d 43/06
[58] Field of Search............. 192/41 A, 45.1, 104 R, 192/104 B

[56] References Cited
UNITED STATES PATENTS
2,599,793   6/1952   Warner.............................. 192/45.1
3,022,875   2/1962   Davis................................. 192/45.1
3,498,429   3/1970   Frakes.............................. 192/104 B
3,545,581   12/1970  Kent.................................. 192/104 B
3,702,649   11/1972  Giese et al. ...................... 192/104 B Primary Examiner—Allan D. Herrmann
Attorney, Agent, or Firm—Herman E. Smith

[57] ABSTRACT

A freewheeling clutch includes wedging members, such as sprags, arranged between an inner race having an outer cylindrical clamping surface and a concentric outer race having an inner cylindrical clamping surface, the sprags being rotated in the engaging sense by spring tension and being rotated in the disengaging sense under the effect of centrifugal force.

10 Claims, 3 Drawing Figures

SPRAG TYPE FREEWHEEL CLUTCH

BACKGROUND OF THE INVENTION

1. Field of the Invention

The present invention relates to a freewheeling clutch with wedging members, such as sprags, arranged between an inner race having an outer cylindrical clamping surface and a concentric outer race having an inner cylindrical clamping surface, the sprags being rotated in the engaging sense by spring tension and being rotated in the disengaging sense under the effect of centrifugal force.

Freewheeling clutches of this type are useful for various purposes, for example, as return locks. It is therefore intended to provide a freewheeling clutch which is free of contact, when freewheeling in order to minimize wear and heating of the wedging members.

2. Prior Art

It is known to provide freewheeling clutch in which the inner race is free of contact with the sprags when freewheeling. At a predetermined speed of rotation of the outer race, the sprags are lifted from the inner race by centrifugal force during freewheeling.

In many cases, an inner machine member is the shaft which rotates during freewheeling. In such cases, it is necessary to connect the inner machine member to the outer race of the clutch in order to obtain release of the sprags from the inner race by means for centrifugal force. An inversion of the shaft ends is required for this, connecting the inner race of the clutch to the housing outside the machine while connecting the inner shaft with the outer race of the clutch, as already mentioned.

A further form of freewheeling clutch is known in which, following disengagement, the sprags can lift off the inner race without the need to reverse the ends of the shaft and where the space requiring bell-shaped outer races were omitted. In addition, the sprags will lift off the outer race in this clutch. Such a form of freewheeling clutch is especially advantageous, when the wear during freewheeling is to be diminished to the greatest possible extent. These advantages are obtained in the known freewheeling clutch by having the sprags supported by a ring which revolves with the inner race, and by having a rocker shaft arranged so that the outer clamping surfaces of the sprags are lifted from the cylindrical inner surface of the outer race by means of rotational movement under the influence of centrifugal force. During the rotational movement, the sprags roll with the surfaces of the rocker shaft bearing on the surfaces of the supporting ring. It has, however, been shown that the freewheeling clutch is not always satisfactory in practice. The production of shoulders and recesses is expensive, and the mounting of the sprags is difficult. The sprags are not held sufficiently in the circumferential direction when no additional cage is provided. However, such a cage guides the outer surfaces of the sprags and causes friction which hinders the rotational movement of the sprags under the influence of centrifugal force. The one sided energization which occurs has the result that the sprags can assume a nonparallel position with respect to the axis of the clutch, when the clutch is engaged.

SUMMARY OF THE INVENTION

Among the objectives of the present invention are to provide a freewheeling clutch which is especially strong and simple in construction, permits easy assembly, avoids reversal of the shaft, and which provides freedom from contact at the inner and outer races of the clutch by the action of centrifugal force. In addition, the clutch should be suitable for large diameters, for example, for diameters in the order of 20 inches.

The accomplishment of the above objectives is obtained by a freewheeling clutch of the first mentioned type in which according to the present invention, the sprags are through bored parallel to the clamping surface and held by axially extending pins supported in laterally spaced cage plates of the freewheeling clutch which are frictionally coupled to the inner race, and are shiftable with respect to the cage plates in a substantially radial direction by a small clearance in the order of 1 to 4 percent, preferably 1.5 to 3 percent, of the height of the sprag so that the sprags are shifted to the side and turned against the spring force acting on them under the effect of a predetermined centrifugal force, the sprags being first lifted from the inner race, being thereafter carried by the pins fastened into the cage plates, and after further rotary movement being lifted from the outer race. The clearance is selected so that the desired action takes place. It is selected so that the rotary movement of the sprags is not impaired when applying torque. As the height of the sprags increases, the clearance becomes smaller in relation to the height of the sprags.

In the new freewheeling clutch, the sprags are held by the cage plates rotating with the inner race, without resting on either the inner or outer race of the clutch during freewheeling. The assembly of sprags with the cage plates takes place in an extremely simple way without the use of any special construction parts. The use of special rings for supporting the sprags and the arrangement of special turning axes are eliminated. The assembly of the clutch can take place without additional expenses.

The pins guide the sprags in the circumferential direction without restraining them in their rotary movement. The pins fulfill simultaneous functions as rocker shafts and as supports for the sprags.

According to one embodiment of the invention, the sprags can be shifted on the pins and the pin ends are supported with clearance in the bores of the cage plates. The necessary movement of the sprags for the desired lifting process of the sprags from the inner and outer races of the clutch is made possible by the location of the ends of the pins with clearance in the cage plates. The cage plates are held in the desired position by spacers. Cross pins may be used as spacers which are hereinafter described, serving as support for the springs.

An especially advantageous embodiment of the invention is obtained where the axes of the bores in the sprags are identical with the axes of the cylindrical portions of the clamping surfaces of the sprags which cooperate with the inner race. The axes of the cylindrical portions of the inner clamping surfaces remains the same distance from the central axis of the clutch during rotary movement of the sprags, and the length of paths of the sprags are equal in circumferential direction.

The sprags are supported by leg springs in the engaging sense. The coils of the leg springs encompass the pin ends, which are surrounded by washers having suitable clearance.

The ends of the leg springs engage cross bars arranged between the pins in circumferential direction.

The sprags are provided with suitable nose portions on their cantilevering sides engaging the spring cross rods and stopping the centrifugally conditioned rotary movement of the sprags by a stop on the cross bars.

A specific embodiment of the invention is shown in the drawings.

DESCRIPTION OF THE PREFERRED EMBODIMENT

Figure 1:
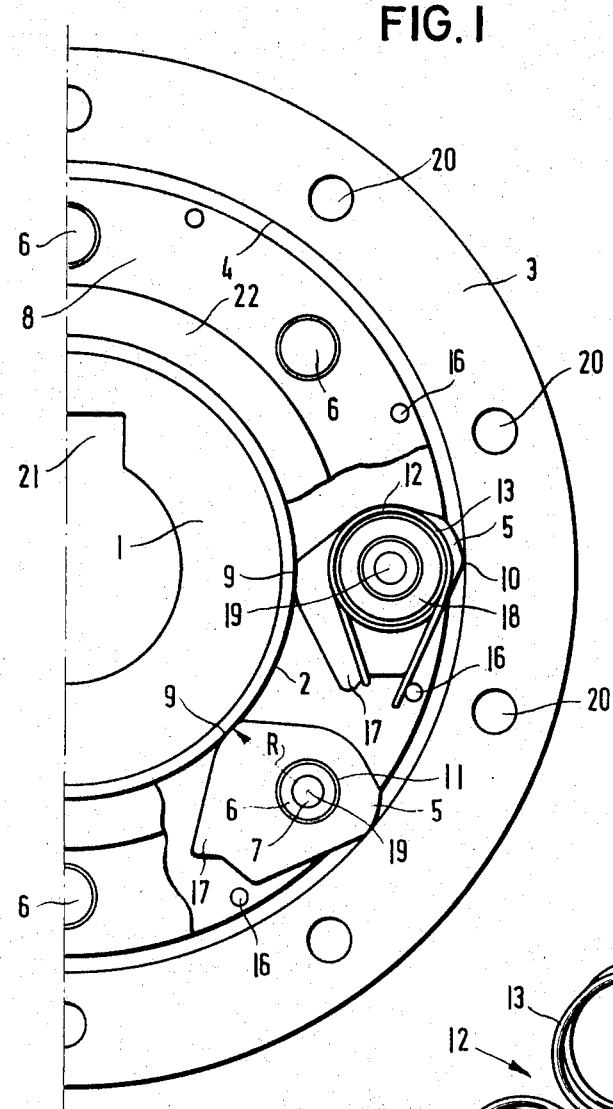
FIG. 1 shows half of the freewheeling clutch in plan view.

The freewheeling clutch according to FIG. 1 includes basically an inner race 1 with an outer cylindrical surface 2, an outer race 3 with an inner cylindrical surface 4, and the sprags 5. The FIGURE shows only one half of the clutch since both halves are mutually symmetrical except that the sprags 5 are arranged in one direction. The sprags 5 are held by pins 6 having ends 7 which are riveted to the lateral cage plates 8. A portion of cage plate 8 is broken away in order to show the position and shape of sprags 5 and pins 6. The sprags 5 are made non-symmetrically in a known manner. The inner clamping surfaces 9 lie on the clamping surface 2 of the inner race 1, and the outer clamping surfaces 10 lie on the clamping surface 4 of the outer race 3. The pins 6 are inserted with clearance into the bores 11 of the sprags 5.

Figure 3:
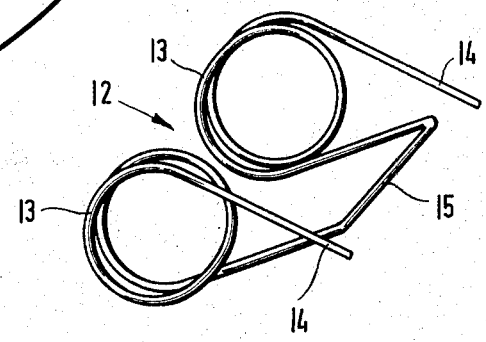
FIG. 3 shows the leg spring in perspective view.

Each sprag 5 has a two-limbed leg spring 12 which, as shown by FIG. 3, includes two lateral coils 13, one spring leg end 14 extending from each coil 13, and a spring cross rod 15 connecting the coils 13. The spring leg ends 14 bear upon the cross bars 16. The spring cross rods 15 are engaged with the nose portions 17 of the sprags 5. The coils 13 are mounted on the pins 6, washers 18 and then slid upon the pins 6 in order to avoid impairment of the spring force by shifting of the sprags to one side or the other. The diameter of coils 13 are adapted to the size of washers 18.

The springs 12 encompass the sprags 5 on both ends and result in forces acting symmetrically upon the sprags 5, due to their design and arrangement. In the FIGURE, the springs rotate the sprags 5 clockwise in the engaging direction. On the other hand, centrifugal force acting upon the sprags 5, rotate the sprags 5 in the opposite direction. The sprags are therefore shaped so that their centers of gravity lie adjacent the turning axes 19.

The sprags are supported with clearance by the axially extending pins 6. The desired slight radial shift of the sprags 5 is thus permitted during disengagement under the influence of centrifugal force. The above mentioned washers 18 are mounted upon the pins with the same clearance.

The nose portions 17 of sprags 5 serve as a stop for spring 12. and serve to limit the angle of rotation of the sprags 5 under the action of centrifugal force, since the nose portions 17 are abuttable against the cross bars 16.

The outer race 3 is provided with apertures 20 for the reception of screws for connection to a respective part of a machine. The inner race 1 has a slot 21 for attachment to a shaft.

The frictional coupling between the cage plates 8 and the inner race 1 is obtained by the application of spring rings 22 which are inserted into the respective grooves 23 in inner race 1 and having a portion extending outwardly of the groove for engaging the cage plates 8. The cage plates 8 are simple sheet metal plates which may be produced by stamping. The connection of the cage plates 8 is formed by riveting the pin ends 7 to the plates 8, and a cage is formed with sprags 5, springs 12 and washers 18, forming a closed complete unit ready for installation. No individual parts can become separated from this cage.

In the position of the sprags 5 shown in the drawing, the rocker shafts 19 are simultaneously the axes of the bores 11 of the sprags 5. These axes are identical with the axes of the cylindrical portions of the inner clamping surfaces 9. The radius "R" of the inner clamping surface 9 is indicated in the sprag shown without the spring 12. Such selection of the radius "R" for the inner clamping surfaces 9 has the result that the axes of the cylindrical portions of the clamping surfaces 9 remain the same distance from the central axis 24 of the clutch under load during rotary movement of the sprags 5.

Figure 2:
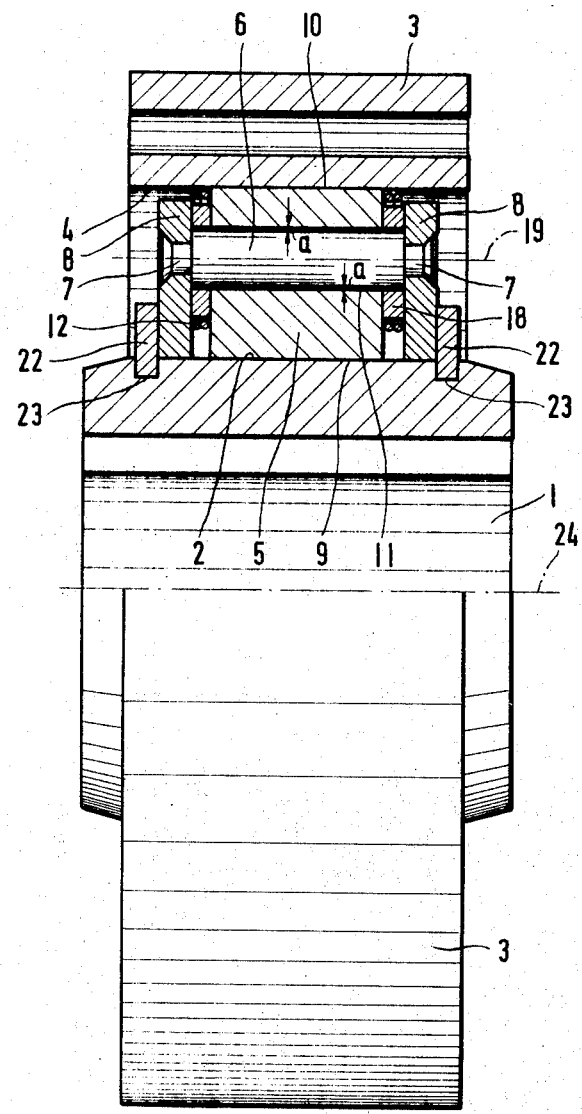
FIG. 2 shows the freewheeling clutch in side view, partly in cross section.

The freewheeling clutch is shown in side view in FIG. 2. In order to illustrate the organization and arrangement of the individual parts of the clutch, the upper half of the clutch is shown in cross-section.

The sprags 5 are placed between the outer race 3 and the inner race 1. The sprags 5 are mounted with clearance $a$ on pins 6. The washers 18, on each side of sprags 5, are mounted on pins 6 with clearance.

The ends 7 of the pins have a reduced diameter with respect to the diameter of the pins 6. The inner sides of cage plates 8 rest against the shoulders thus formed. The pin ends 7 are inserted into respective bores in the cage plates 8 and riveted. The bores are chamfered for riveting.

The spring rings 22 contact the cage plates 8. The frictional coupling of cage plates 8 with the inner race 1 prevents the creation of excessive forces between the sprag and the cage during engagement.

The pins 6 have the following summarized functions as shown in the example: they guide the sprags 5 in circumferential direction without hindering them in their rotary movement which occurs when applying torque, they provide mounting supports and turning axes during rotary movement of the sprags 5 under the influence of centrifugal force; they guide by means of the washer 18, the leg springs 12 which bias the sprag 5 in the engaging sense; and they connect the lateral cage plates 8, so that a cage can be combined with sprags 5, plates 8, and springs 12 to form a closed unit ready for assembly.

In the new design of clutch, no reaction forces between the sprags and cage are created when applying load during rotary movement. The sprags 5 are guided by pins 6 and the frictional forces arising from rotary movement are negligibly small.

I claim:

1. A freewheeling clutch having a plurality of sprags between an outer cylindrical clamping surface of an inner race and an inner cylindrical clamping surface of a concentric outer race, said sprags being subject to turning in an engaging direction by spring force and subject to turning in a disengaging direction under the effect of centrifugal force, characterized in that each of said sprags includes a bore extending parallel to a clamping surface, each of said sprags being retained between a pair of laterally spaced cage plates by means of a pin extending through said bore and supported at respective ends thereof in said cage plates, each of said pins being formed with a clearance selected for permitting limited radial outward movement of said sprag with respect to said cage plates, said cage plates being frictionally coupled to said inner race, each sprag being movable radially and rotatable out of engagement with both said inner and outer clamping surfaces under the influence of centrifugal force in response to rotation of said inner race above a predetermined speed of rotation.

2. A freewheeling clutch according to claim 1, characterized in that said sprags are rotatably supported on said pins, said pin ends being formed to provide clearance in bores of said cage plates.

3. A freewheeling clutch according to claim 1, characterized in that said sprags are rotatably supported on said pins, said pins being formed to provide clearance in the bore of said sprags, said pins having ends thereof secured to said cage plates.

4. A freewheeling clutch according to claim 1, characterized in that said sprags are supported for engagement by leg springs having coils encircling the ends of the pins.

5. A freewheeling clutch according to claim 4, characterized in that a washer is mounted on each end of respective pins for aligning the coils of said spring on the ends of said pin.

6. A freewheeling clutch according to claim 5, characterized in that said spring includes respective leg portions extending from respective coils thereof, said leg portions engaging cross bars, said cross bars being arranged between said pins in the circumferential direction.

7. A freewheeling clutch according to claim 6, characterized in that said sprags have nose portions on their cantilevering ends, said nose portions providing contact surface for cross rods of said leg springs, said nose portions being abuttable against said cross bar for limiting rotation of said sprags.

8. A freewheeling clutch according to claim 1, characterized in that each of said sprags is biased in the engaging direction by a respective two-limbed leg spring, each of said springs having a pair of spaced coils encompassing the ends of a spring and encircling the ends of a respective pin.

9. A freewheeling clutch according to claim 8, characterized in that said two-limbed leg spring includes a leg portion extending from each of said spaced coils thereof, said leg portions engaging cross bar means extending from said cage plates between a pair of pins.

10. A freewheeling clutch according to claim 9, characterized in that each of said sprags is formed with a cantilevering side including a nose portion displaced to one side of said bore, said two limbed leg spring including a cross rod extending between said pair of spaced coils engaging said nose portion.

* * * * *